United States Patent [19]
Klement

[11] Patent Number: 5,827,021
[45] Date of Patent: Oct. 27, 1998

[54] RELEASABLE TOOL-HOLDER MOUNT FOR MACHINING SPINDLE

[76] Inventor: Klaus-Dieter Klement, St.Mauri-Strasse 1, D-52428 Jülich, Germany

[21] Appl. No.: 771,767

[22] Filed: Dec. 20, 1996

[30] Foreign Application Priority Data

Jan. 3, 1996 [DE] Germany .......................... 196 00 089.0

[51] Int. Cl.$^6$ ...................................................... B23D 7/00
[52] U.S. Cl. ......................... 409/231; 409/233; 279/2.03; 408/228; 408/239 A
[58] Field of Search .................................... 409/233, 231; 408/239 A, 228; 279/2.03, 2.12

[56] References Cited

U.S. PATENT DOCUMENTS

| 4,122,755 | 10/1978 | Johnson et al. | 408/238 |
| 4,978,262 | 12/1990 | Tjernstrom | 279/2.12 |
| 4,997,325 | 3/1991 | Heel et al. | 409/233 |
| 5,018,916 | 5/1991 | Bauch et al. | 409/233 |
| 5,391,027 | 2/1995 | Green | 409/233 |

FOREIGN PATENT DOCUMENTS 41 10 720   10/1992   Germany .

*Primary Examiner*—Daniel W. Howell
*Assistant Examiner*—Adesh Bhargava
*Attorney, Agent, or Firm*—Herbert Dubno; Andrew Wilford

[57] ABSTRACT

A driven part of a tool is secured to a drive part of a drive spindle rotatable about an axis by a mount having a tubular extension projecting axially forward from one of the parts and formed centered on the axis with a radially inwardly projecting collar and a recess on the other part complementarily engageable axially over the tubular extension. A retaining element in the tubular extension has a plurality of dogs deflectable radially between an outer blocking position axially behind the collar and an inner position radially rearward of the collar. An actuating member in the retaining element in the tubular extension has a camming edge engageable forward with the dogs. Interengaging coupling formations between the member and the other part inhibit rotation of the member relative to the other part while permitting axial displacement of the member relative to the parts between a rear position clear of the dogs with same in the inner position and a front position pressing the dogs outward into the outer position. An actuating rod centered on the axis has a rear end formed with a screwthread threaded into the actuating member and a front end formed with a screwthread threaded into the other part. The screwthreads of the rod are of opposite hand so that rotation of the rod about the axis in one direction displaces the member forward toward its front position and opposite rotation displaces the member rearward toward its rear position.

20 Claims, 3 Drawing Sheets

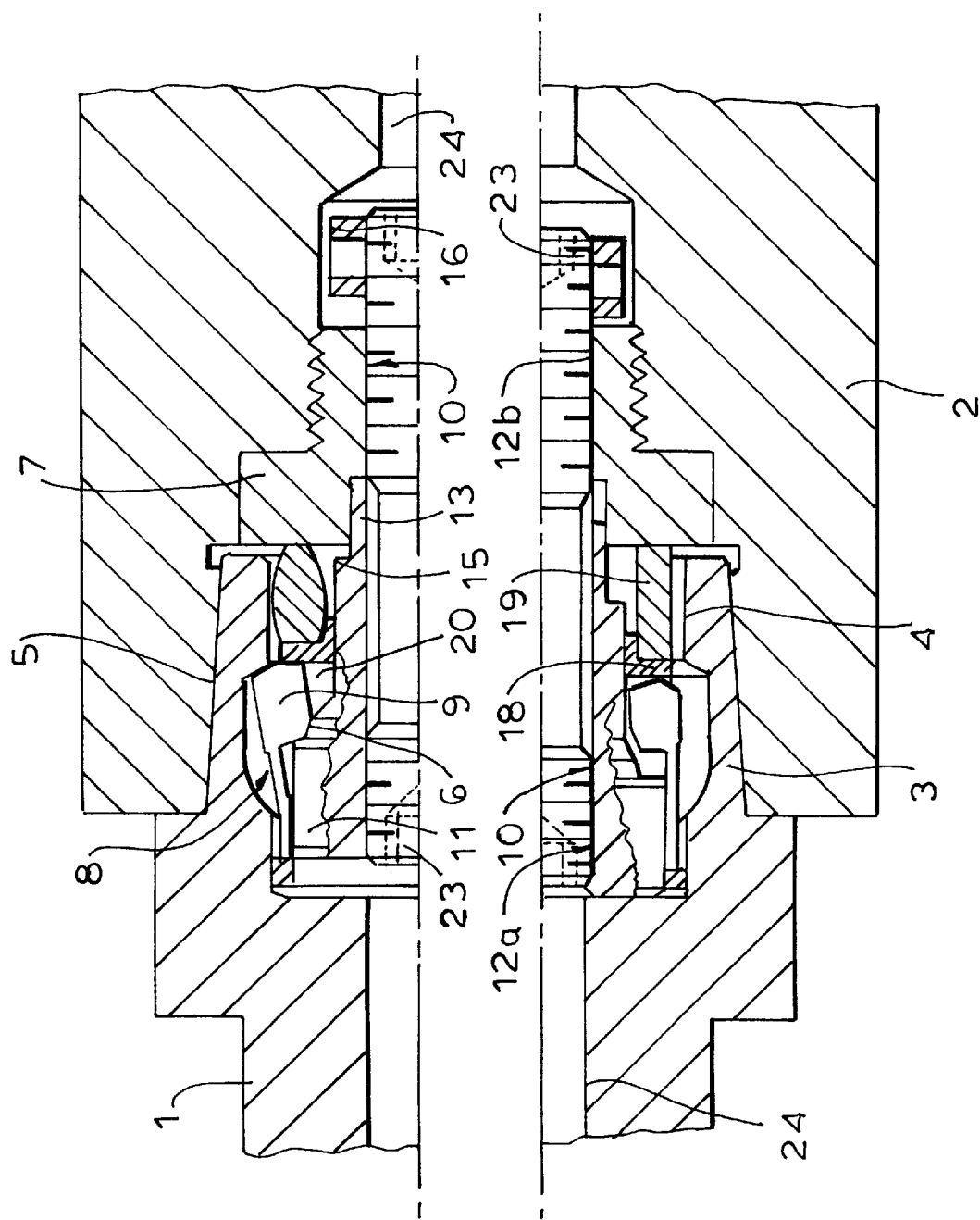

RELEASABLE TOOL-HOLDER MOUNT FOR MACHINING SPINDLE

FIELD OF THE INVENTION

The present invention relates to an apparatus for mounting a tool holder on a machine spindle. More particularly this invention concerns a mount for securing a tool such as a grinding wheel on a high-speed spindle.

BACKGROUND OF THE INVENTION

As described in German patent document 4,110,720 a driven part of a tool is fixed on a drive part of a drive spindle rotatable about an axis by a mount having a tubular extension projecting axially forward from one of the parts and formed centered on the axis with a radially inwardly projecting collar and a recess that is formed on the other part and that is complementarily engageable axially over the tubular extension. A retaining element in the tubular extension has a plurality of dogs deflectable radially between an outer blocking position axially behind the collar and an inner position radially inward of the collar. An actuating member in the retaining element in the tubular extension has a camming edge engageable outward with the dogs and interengaging formations between the actuating member and the other part inhibiting rotation of the actuating member relative to the other part while permitting axial displacement of the actuating member relative to the parts between a rear freeing position clear of the dogs with same in the respective inner position and a front position pressing the dogs outward into the respective outer blocking position.

A ring gear axially fixed in the other part coaxially surrounds the actuating member and is formed with an internal thread meshing with an external thread of the actuating member. A pinion rotatable in the other part about an axis extending radially of the spindle axis has teeth meshing like a right-angle drive with teeth of the ring gear. Thus rotation of the pinion in one direction rotates the ring gear in one direction and displaces the actuating member axially in one direction, and opposite rotation oppositely displaces all these parts. Hence the pinion can be used to axially displace the actuating member and thereby move the dogs between their outer position in which they hold the two parts together and their rear position.

This mechanism is fairly complex and adds excessively to the cost of the tool mount and spindle. In addition it creates an eccentric mass that must be compensated for carefully in order to avoid vibration at high rotation speeds.

OBJECTS OF THE INVENTION

It is therefore an object of the present invention to provide an improved mount for a tool on a spindle.

Another object is the provision of such an improved mount for a tool on a spindle which overcomes the above-given disadvantages, that is which is relatively simple and which can be rotated at very high speeds without creating vibration.

SUMMARY OF THE INVENTION

A driven part of a tool is secured to a drive part of a drive spindle rotatable about an axis by a mount having according to the invention a tubular extension projecting axially forward from one of the parts and formed centered on the axis with a radially inwardly projecting collar and a recess on the other part complementarily engageable axially over the tubular extension. A retaining element in the tubular extension has a plurality of dogs deflectable radially between an outer blocking position axially behind the collar and an inner position radially rearward of the collar. An actuating member in the retaining element in the tubular extension has a camming edge engageable forward with the dogs. Interengaging coupling formations between the member and the other part inhibit rotation of the member relative to the other part while permitting axial displacement of the member relative to the parts between a rear position clear of the dogs with same in the inner position and a front position pressing the dogs outward into the outer position. An actuating rod centered on the axis has a rear end formed with a screwthread threaded into the actuating member and a front end formed with a screwthread threaded into the other part. The screwthreads of the rod are of opposite hand so that rotation of the rod about the axis in one direction displaces the member forward toward its front position and opposite rotation displaces the member rearward toward its rear position.

According to the invention all of the mount, namely the parts, extension, recess, actuating member, formations, and actuating rod are symmetrical to the axis. Thus this relatively simple system, which replaces the gear-type right-angle drive of the prior art with a single double-threaded spindle, can be rotated at very high speed without creating any vibration or throw.

The actuating member according to the invention is a sleeve and has an end constituting one of the coupling formations. The other part is formed with an axially extending guide recess complementarily surrounding the sleeve end and forming the other of the coupling formations. Normally the sleeve and guide recess are of polygonal section.

The actuating member has a front-end abutment face and the other part has a rearwardly directed face axially engageable with the actuating-member end face and the rod has a front end provided with a stop ring axially rearwardly engageable with the one part. The abutment face and stop ring therefore delimit the axial travel of the rod.

In accordance with a further feature of the invention a spring is braced axially between the other part and the retaining element for urging same axially rearward. This spring engages via a ring centered on the axis axially backward with the dogs. The spring itself is annular, centered on the axis, and braced axially between the ring and a rearwardly directed face of the other part.

The retaining element according to the invention is formed of an annularly continuous rear ring, and a plurality of fingers projecting forward from the ring and having front outer ends forming the dogs. The other part includes a mounting ring formed with a screwthread by means of which it is secured in the other part. The mounting ring, actuating member, and actuating element together form a subassembly securable by the mounting-ring screwthread in the other part.

It is also possible for the actuating member to be formed as a solid bolt having one end formed with an internally threaded blind bore into which the rear end of the rod is threaded. In this case the other part includes a cap engaged over the one end of the actuating member and formed internally with one of the coupling formations. This cap is provided with a fixed guide ring fitting complementarily around the bolt and having the one coupling formation.

The rod is formed at least one end centered on the axis with a tool-engaging formation. This formation is a polygonal-section pocket, for instance hexagonal for engagement with a standard hex key.

BRIEF DESCRIPTION OF THE DRAWING

The above and other objects, features, and advantages will become more readily apparent from the following description, reference being made to the accompanying drawing in which:

FIGS. 2A, 2B and 3A, 3B are views like respective FIGS. 1A and 1B of further tool mounts in accordance with the invention.

SPECIFIC DESCRIPTION

Figure 1A:
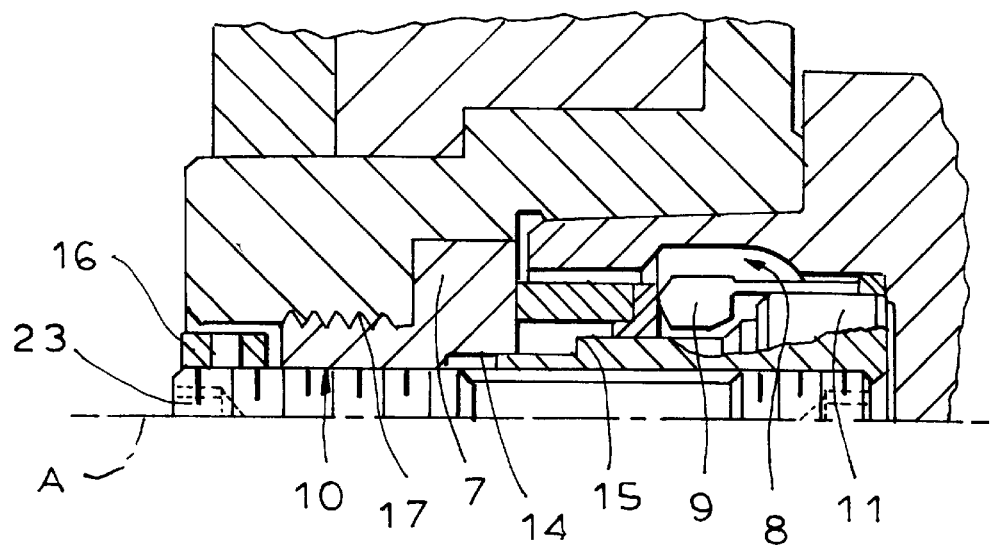
FIGS. 1A and 1B are axial sections through a first embodiment of the tool mount according to the invention respectively in the freeing and holding positions.
Figure 1B:
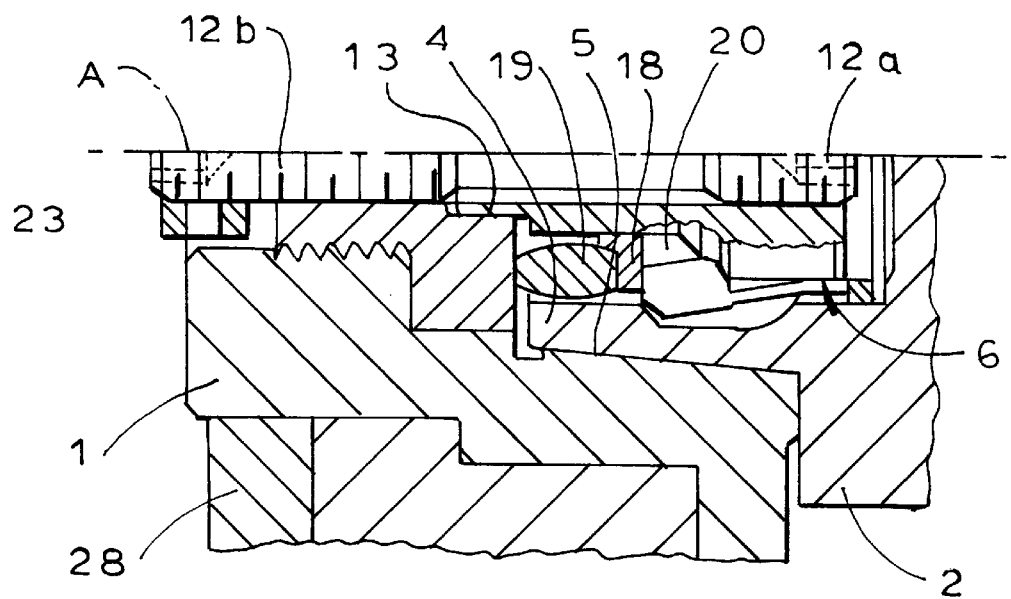

As seen in FIGS. 1A and 1B a holder 1 for a tool 28, for instance a grinding wheel, is symmetrical to an axis A and is formed with a rearwardly frustoconically flared hole 5 that fits complementarily with a tubular end 3 of a machine spindle 2 that is rotated at high speed about the axis A. A securing rod 10 also centered on the axis A has a front end formed with a screwthread 12b threaded in an L-section mounting ring 7 fixed by a screwthread 17 in the holder 1 and a rear end formed with a screwthread 12a of opposite hand and threaded into a clamping or retaining sleeve 11. This sleeve 11 has a front end 13 of polygonal section that fits axially in a recess 14 of complementary shape in the mounting ring 7 so that this sleeve 11 cannot rotate about the axis A relative to the part 1 but can move axially in the part 1.

Figure 4:
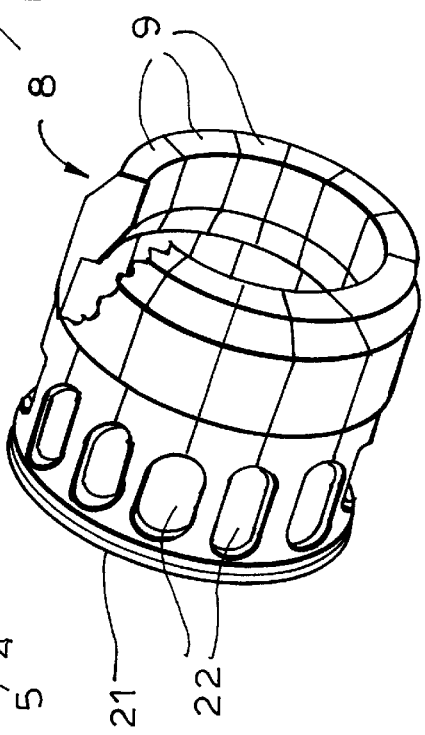
FIG. 4 is a perspective view of the retaining element of the tool mount of all embodiments of this invention.

The front end of the tubular end 3 of the spindle 3 is formed with an annularly continuous and inwardly projecting collar 4 that is spaced forward from a frustoconical actuating surface 6 of the sleeve 11. In addition as shown in FIG. 4 a clamping element 8 carried coaxially on the sleeve 11 has at its rear end an annularly continuous ring 21 and is formed with a plurality of radially deflectable dogs or fingers 8 separated at the ring 21 by cutouts 22. These dogs 8 lie in a space 20 defined rearwardly by the surface 6 and forwardly by a ring 18 that can slide axially on the rod 10. A spring element 19, here a rubber ring, presses the ring 18 rearward against the front end of the dogs 9 so that the element 8 is urged rearward into the position of FIG. 1A.

The sleeve 11 has a forwardly directed abutment shoulder 15 engageable with a face of the part 7 of the mount 1. In addition the rod 10 carries on its front end an abutment ring 16 that can engage rearward with the front end of the part 7, to define with the shoulder 15 limits to the axial travel of this rod 10 in the mount 1. Each end of the rod 11 is formed with a tool-engaging formation 23 in the form of a hexagonal pocket that can fit with a hex key or the like for adjustment of the device.

With the parts in the position of FIG. 1A it is possible to insert the front end 3 of the spindle 2 into the hole 5 of the holder 1, automatically centering in each other on the axis A these two subassemblies which are wholly axially symmetrical of the axis A. Then a hex key is inserted into the pocket 23 and the rod 10 is rotated. This action will shift the sleeve 11 forward, that is toward the left in FIGS. 1A and 1B so that its camming surface 6 will engage the rear edges of the dogs 9 and force same out while at the same time shifting the whole element 8 forward with compression of the spring 19 until the dogs 9 contact the rear edge of the collar 4. In this position which is shown in FIG. 1B axial separation of the two parts 1 and 2 is impossible and the spindle 2 can be rotated at high speed to spin the tool 28 mounted on the holder 1. Since all elements of the structure are axial symmetrical about the axis A in all positions, the mount does not create any offcenter weight that would create vibration at high rotation speeds.

The system of FIGS. 2A and 2B is functionally identical to that of FIGS. 1A and 1B, except that the hole 5 is formed on the spindle 2 and the end 3 is formed on the holder 1. In addition the two parts 1 and 2 are formed centered on the axis A with throughgoing bores 24 for access to the tool pockets 23 at both ends of the rod 10.

Figures 3A, 3B:
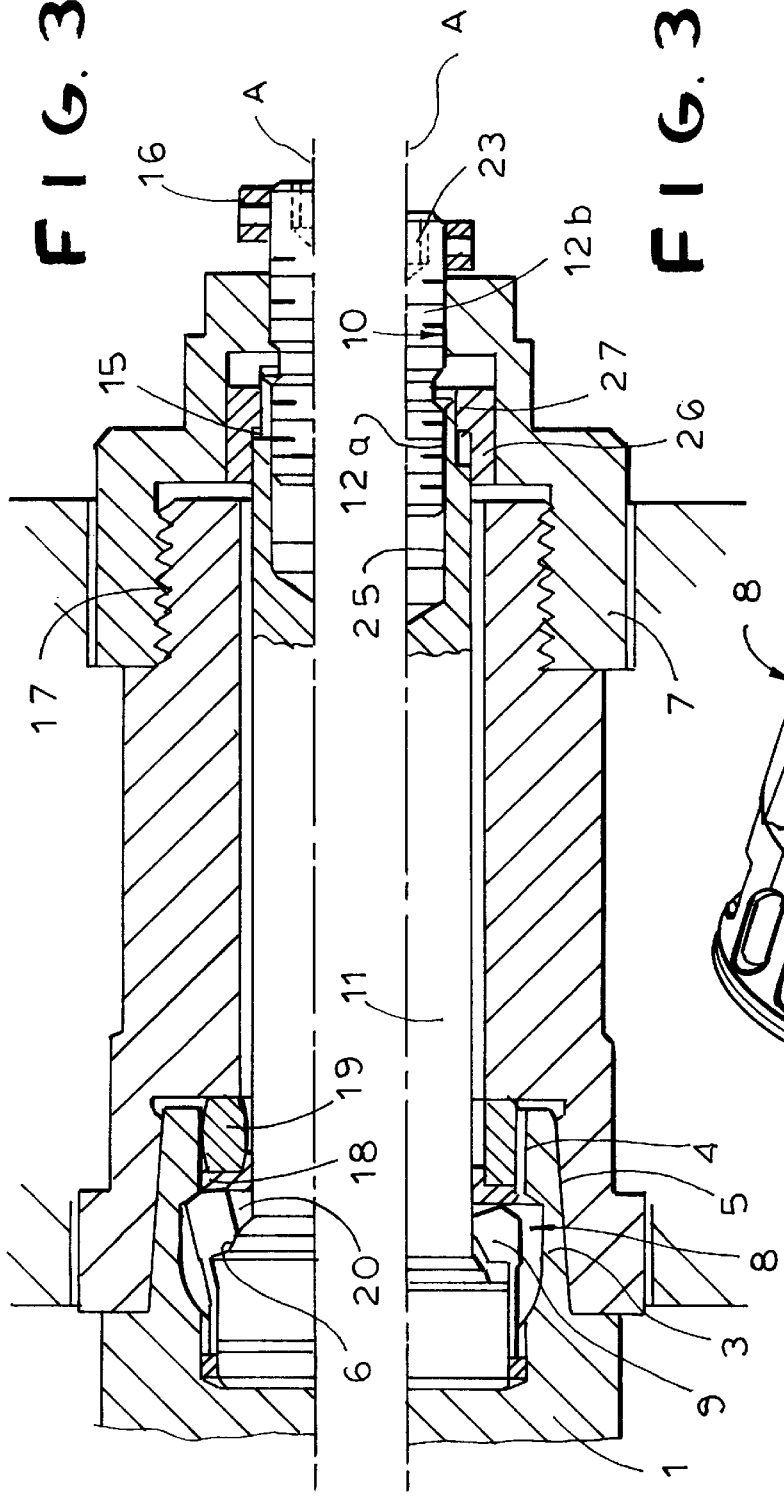

In FIGS. 3A and 3B the sleeve 11 is elongated and has a tubular end 25 into which is screwed the rod 10. The part 7 is formed as a cap sitting on the end of the spindle 2 and has a liner 26 formed with spline formations 27 that rotationally couple the part 11 to the spindle 2. Otherwise this system functions identically to the other two embodiments described with reference to FIGS. 1A through 2B.

In all embodiments the rod 10, stop ring 16, sleeve 11, ring 7, retaining element 8, ring 18, and spring element 19 form a subassembly that can be installed in the part 1 or 2 simply by threading it into place with the screwthread 17. Thus this subassembly can be replaced very easily for service or repair.

I claim:

1. In combination with a driven part of a tool and a drive tart of a drive spindle rotatable about an axis, a mount comprising:

a tubular extension projecting axially forward from one of the parts and formed centered on the axis with a radially inwardly projecting collar. the other part being formed with a recess complementarily engageable axially over the tubular extension;

a retaining element in the tubular extension and having a plurality of does deflectable radially between an outer blocking position axially behind the collar and an inner position radially rearward of the collar;

an actuating member in the retaining element in the tubular extension and having a camming edge engageable forward with the dogs;

means including interengaging coupling formations between the member and the other part for inhibiting rotation of the member relative to the other part while permitting axial displacement of the member relative to the parts between a rear position clear of the dogs with same in the inner position and a front position pressing the dogs outward into the outer position;

an actuating rod centered on the axis and having a rear end formed with a screwthread threaded into the actuating member and a front end formed with a screwthread threaded into the other part, the screwthreads of the rod being of opposite hand. whereby rotation of the rod about the axis in one direction displaces the member forward toward its front position and opposite rotation displaces the member rearward toward its rear position; and spring means braced axially between the other part and the retaining element for urging same axially rearward. the spring means including
a ring centered on the axis and engaged axially backward with the dogs, and
an annular spring centered on the axis and braced axially between the ring and a rearwardly directed face of the other part.

2. The tool mount defined in claim 1 wherein the actuating member is a sleeve and has an end constituting one of the coupling formations, the other part being formed with an axially extending guide recess complementarily surrounding the sleeve end and forming the other of the coupling formations.

3. The tool mount defined in claim 2 wherein the sleeve and guide recess are of polygonal section.

4. The tool mount defined in claim 1 wherein the actuating member has a front-end abutment face and the other part has a rearwardly directed face axially engageable with the actuating-member end face and the rod has a front end provided with a stop ring axially rearwardly engageable with the one part.

5. The tool mount defined in claim 1 further comprising
spring means braced axially between the other part and the retaining element for urging same axially rearward.

6. The tool mount defined in claim 1 wherein the other part includes a mounting ring formed with a screwthread by means of which it is secured in the other part, the mounting ring, actuating member, and actuating element together forming a subassembly securable by the mounting-ring screwthread in the other part.

7. The tool mount defined in claim 1 wherein the actuating member is formed as a solid bolt having one end formed with an internally threaded blind bore into which the rear end of the rod is threaded.

8. In combination with a driven part of a tool and a drive part of a drive spindle rotatable about an axis, a mount comprising:

a tubular extension projecting axially forward from one of the parts and formed centered on the axis with a radially inwardly projecting collar. the other part being formed with a recess complementarily engageable axially over the tubular extension, the other part including a cap engaged over the one end of the actuating member and formed internally with one of the coupling formations;

retaining element in the tubular extension and having a plurality of dogs deflectable radially between an outer blocking position axially behind the collar and an inner position radially rearward of the collar;

a solid bolt in the retaining element in the tubular extension and having a camming edge engageable forward with the dogs and one end formed with an internally threaded blind bore;

means including interengaging coupling formations between the member and the other part for inhibiting rotation of the member relative to the other part while permitting axial displacement of the member relative to the parts between a rear position clear of the dogs with same in the inner position and a front position pressing the dogs outward into the outer position; and an actuating rod centered on the axis and having a rear end formed with a screwthread threaded into the rear end of the solid bolt and a front end formed with a screwthread threaded into the other part. the screwthreads of the rod being of opposite hand. whereby rotation of the rod about the axis in one direction displaces the member forward toward its front position and opposite rotation displaces the member rearward toward its rear position.

9. The tool mount defined in claim 8 wherein the cap is provided with a fixed guide ring fitting complementarily around the bolt and having the one coupling formation.

10. The tool mount defined in claim 1 wherein the rod is formed at least one end centered on the axis with a tool-engaging formation.

11. The tool mount defined in claim 10 wherein the tool-engaging formation is a polygonal-section pocket.

12. The tool mount defined in claim 1 wherein the parts, extension, recess, actuating member, formations, and actuating rod are all symmetrical to the axis.

13. In combination with a driven part of a tool and a drive part of a drive spindle rotatable about an axis. a mount comprising:

a tubular extension projecting axially forward from one of the parts and formed centered on the axis with a radially inwardly projecting collar. the other part being formed with a recess complementarily engageable axially over the tubular extension;

a retaining element in the tubular extension and having a plurality of dogs deflectable radially between an outer blocking position axially behind the collar and an inner position radially rearward of the collar, the retaining element being formed of
an annularly continuous rear ring, and
a plurality of fingers projecting forward from the ring and having front outer ends forming the dogs;

an actuating member in the retaining element in the tubular extension and having a camming edge engageable forward with the dogs;

means including interengaging coupling formations between the member and the other part for inhibiting rotation of the member relative to the other part while permitting axial displacement of the member relative to the parts between a rear position clear of the dogs with same in the inner position and a front position pressing the dogs outward into the outer position; and an actuating rod centered on the axis and having a rear end formed with a screwthread threaded into the actuating member and a front end formed with a screwthread threaded into the other part, the screwthreads of the rod being of opposite hand, whereby rotation of the rod about the axis in one direction displaces the member forward toward its front position and opposite rotation displaces the member rearward toward its rear position.

14. The tool mount defined in claim 13 wherein the actuating member is a sleeve and has an end constituting one of the coupling formations, the other part being formed with an axially extending guide recess complementarily surrounding the sleeve end and forming the other of the coupling formations.

15. The tool mount defined in claim 14 wherein the sleeve and guide recess are of polygonal section.

16. The tool mount defined in claim 13 wherein the actuating member has a front-end abutment face and the other part has a rearwardly directed face axially engageable with the actuating-member end face and the rod has a front end provided with a stop ring axially rearwardly engageable with the one part.

17. The tool mount defined in claim 13 further comprising spring means braced axially between the other part and the retaining element for urging same axially rearward.

18. The tool mount defined in claim 13 wherein the other part includes a mounting ring formed with a screwthread by means of which it is secured in the other part, the mounting ring, actuating member, and actuating element together forming a subassembly securable by the mounting-ring screwthread in the other part.

19. The tool mount defined in claim 13 wherein the rod is formed at least one end centered on the axis with a tool-engaging formation.

20. The tool mount defined in claim 13 wherein the parts, extension, recess, actuating member, formations, and actuating rod are all symmetrical to the axis.

* * * * *